June 26, 1951     D. E. CROOKER     2,557,945
SNOW AND ICE TIRE
Filed Sept. 15, 1947
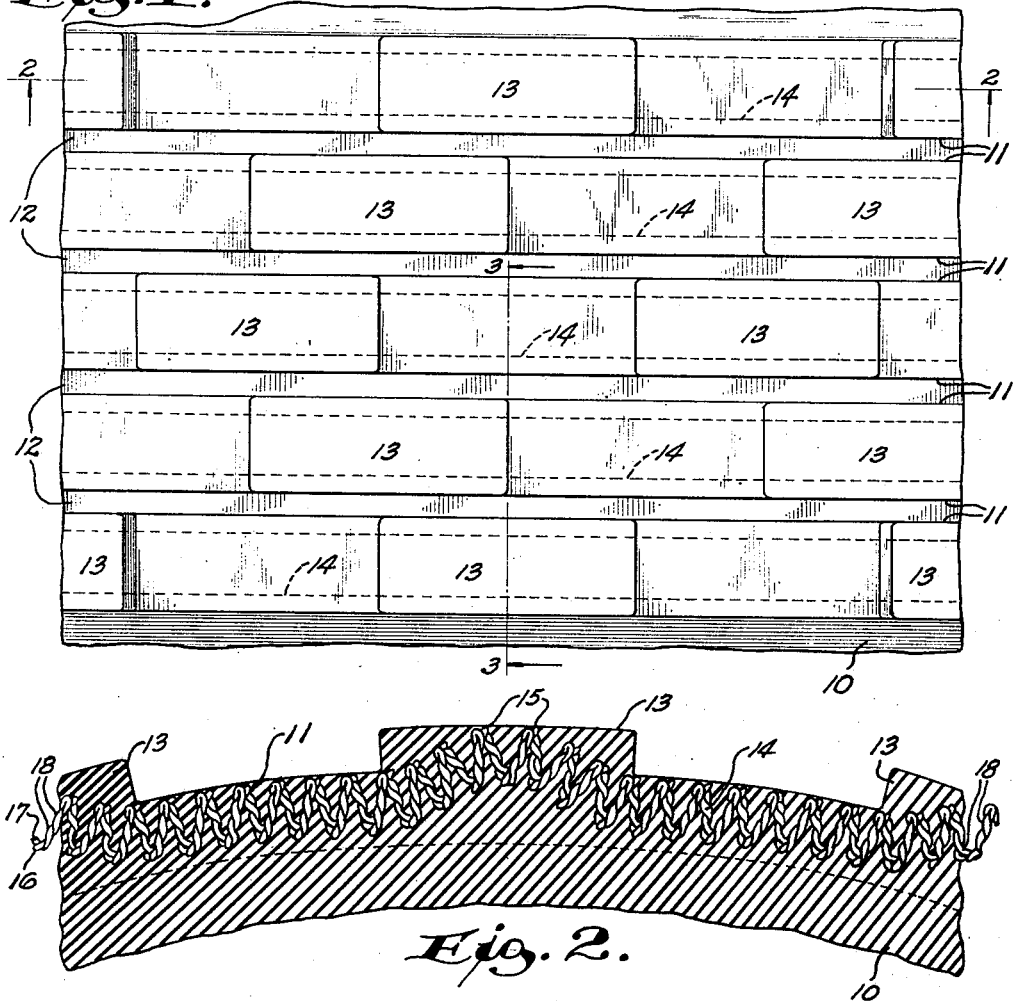
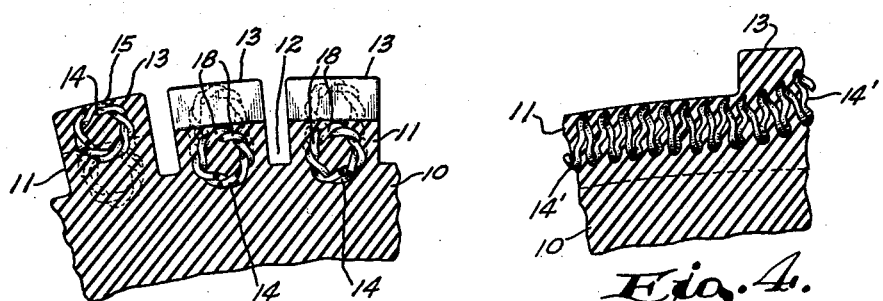
INVENTOR.
David E. Crooker
BY
Morsell & Morsell
ATTORNEYS.

Patented June 26, 1951

2,557,945

UNITED STATES PATENT OFFICE 2,557,945

SNOW AND ICE TIRE

David E. Crooker, Ontonagon, Mich., assignor of one-half to Lloyd L. Felker, Marshfield, Wis.

Application September 15, 1947, Serial No. 774,103

3 Claims. (Cl. 152—211)

This invention relates to improvements in snow and ice tires.

It is a general object of the present invention to provide a tire having a plural level tread for use on snow and ice to produce traction in snow by means of displacement, and having means incorporated in the rider strip of the tread for penetrating the surface of ice to prevent skidding, the said ice penetrating means being effective at more than one tread level.

A further more specific object of the invention is to provide a tire of the class described having coiled wire in the tread rider strips, wherein the coils are formed in a novel manner to provide irregularities which prevent the coils from being pulled out of the rubber, the said irregularities being of a type which minimizes the possibility of weakening the metal of the coil.

A further object of the invention is to provide a tire as above described which includes a coil formed of multiple twisted strands of wire, the twist creating a multiplicity of irregularities which prevent the coil from working out of the rubber during use.

A further object of the invention is to provide a tire having knobbed or double depth tread portions wherein there are coils of wire in the rider strips which are arranged in a wavy course at the surface of the rider strips to follow the surface contour created by the knobbed portions.

A further object of the invention is to provide a tire for use on snow and ice and having ice penetrating coils embodied in the rider strips thereof, wherein new relatively unworn coil sections are presented after the tire has been used for a sufficiently long period to wear away other sections of the coils.

Other objects of the invention are to provide a construction for use on ice or snow which is applicable to both new tires and to retreads; to provide a construction which is relatively simple and inexpensive to manufacture; and to provide a construction which is otherwise well adapted for the purpose described.

With the above and other objects in view, the invention consists of the improved snow and ice tire, and all its parts and combinations, as set forth in the claims, and all equivalents thereof.

In the accompanying drawing, illustrating one complete embodiment of the preferred form of the invention, in which the same reference numerals designate the same parts in all of the views;

Fig. 1 is a fragmentary plan view looking at the tread surface of a tire showing a group of rider strips incorporating features of the present invention.

Fig. 2 is a sectional view taken on the line 2—2 of Fig. 1;

Fig. 3 is a fragmentary sectional view taken on line 3—3 of Fig. 1; and

Fig. 4 is a fragmentary sectional view looking in the same direction as Fig. 2 and showing a modification.

Referring more particularly to the drawing, the numeral 10 designates a tire having a plurality of parallel circumferentially extending rider or tread strips 11, which are spaced apart by circumferentially extending grooves 12. Each rider strip is also preferably formed with longitudinally spaced knobs 13 which create a double depth tread wherever the knobs occur. The knobs may be arranged in any selected pattern, but it is preferred to have them arranged in chevron form as is illustrated in Fig. 1.

Extending circumferentially around the tire and longitudinally of each rider strip is an ice gripping and penetrating coil 14 formed of suitable metal wire. The wire should be formed of solid steel having maximum wear resisting qualities and therefore having substantial strength and stiffness.

Referring to Fig. 2, it is apparent that the coils are adjacent the surface of the rider strips 11, and whenever there is a knob 13, the coil is waved upwardly to substantially contact the upper surface of each rider strip as at 15. It is thus apparent that the coils extend in a wavy pattern and conform to the surface contour of the alternating single and double depth tread.

While the use of any type of coil in a knobbed rider strip, with the coil following the contour created by the knobs, is considered to be novel in itself, nevertheless certain types of wire coils co-operate with the other features of the invention to create new and improved results.

In Fig. 4 a coil 14' formed of a single corrugated strand is utilized. The corrugations in the strand interlock with the rubber in the tire, and minimize the possibility of the coil working out of the tire after prolonged use. However, inasmuch as a coil formed of a corrugated strand has certain weaknesses due to the corrugating process, it is a feature of the present invention to provide a novel method of strengthening the coil while providing an increased number of irregularities therein.

In the principal form of the invention illustrated in Fig. 1, the coil is formed of two strands of solid steel wire 16 and 17, which strands have substantial strength and stiffness and have been twisted together before being coiled to produce in the coil a multitude of irregularities or projections 18. Where a coil is to be used in a relatively large sized tire, such as a truck tire, if the coil were to be formed of a single strand only, then it would have to be of substantially larger diameter than it has been found practical to use. Large diameter wire cannot be satisfactorily processed into the form required for the instant use. However, by twisting two relatively stiff solid wires together, wire of smaller diameter can be successfully employed, and the resulting double strand wire is even stiffer and stronger in a coil than if the coil had been formed from a single strand of increased diameter. Coils formed of two strands twisted together have, therefore, solved the truck tire problem and make it possible to produce coils which will withstand the stresses which are encountered in heavy duty truck work without requiring the use of wire which is of such large diameter that it cannot be processed. It is found that the irregularities created by the twisting operation tend to maintain the coil firmly in position in the tread. Thus even after wear has ground away portions of the coil, the other portions will remain firmly anchored in the rubber. This is particularly important in the double depth tread type of tire illustrated, because eventually portions of the coil in the knobs 13 will be worn away completely, leaving sections below the tread portions 11 which are still intact. Due to the multitude of irregularities created by the twisting operation, the remaining coil portions will stay firmly anchored in place as long as there is anything left of them.

By having a coil follow the surface contour of a knobbed tread, very desirable results are produced. When the tire is new, most of the ice gripping and penetrating function will be carried out by the coil portions 15 which are adjacent the surface of the knobs. Thus the coil portions which are adjacent the surface of the tread 11 proper will be relatively protected against wear. However, after the knobs 13 have been completely worn away, then ice penetrating coil portions which are adjacent the surface of the tread 11 and which are relatively unworn, are presented for use. Thus ice penetrating qualities are preserved for the effective life of the tire.

The use of the knobs on the tread creates a displacement type of traction wherein snow or mud squeezes into the spaces between the knobs 13 to furnish improved traction. In addition both of the tread levels are provided with the ice penetrating coils.

Various changes and modifications may be made without departing from the spirit of the invention and all of such changes are contemplated as may come within the scope of the claims.

What I claim as the invention is:

1. In a tire having a rubber tread portion, laterally spaced, helical metal traction coils extending longitudinally within said rubber tread portion, each coil being positioned with a side portion thereof at least substantially flush with the wearing surface of the rubber tread portion, and each coil comprising two stiff, wear resistant, twisted together solid wires.

2. In a tire having a rubber tread portion, formed with a plurality of laterally spaced, circumferentially extending, rider strips; a helical metal ice-gripping coil extending longitudinally within at least one of said rider strips, said coil being positioned with a side portion substantially flush with the wearing surface of the rider strip, and said coil comprising a pair of stiff, wear resistant, twisted together solid wires.

3. In a tire having a rubber tread portion formed with a plurality of laterally spaced, circumferentially extending, rider strips, there being grooves between said rider strips having bottoms; a helical metal ice-gripping coil extending longitudinally within at least one of said rider strips, each coil being positioned with a side portion thereof located outwardly above the bottoms of the grooves and substantially flush with the wearing surface of the rider strip, and each coil comprising two stiff, wear resistant, twisted together solid wires.

DAVID E. CROOKER.

REFERENCES CITED

The following references are of record in the file of this patent:

UNITED STATES PATENTS

| Number | Name | Date |
| --- | --- | --- |
| 1,159,244 | Midgley | Nov. 2, 1915 |
| 1,251,017 | Hann | Dec. 25, 1917 |
| 2,143,694 | Hauvette | Jan. 10, 1939 |
| 2,165,185 | Suris | July 4, 1939 |